Aug. 26, 1969
S. M. SILVER
3,463,039
KNIFE FOR CUTTING TEAR-LINES IN CARDBOARD
AND METHOD FOR FORMING THE SAME
Filed Jan. 4, 1967
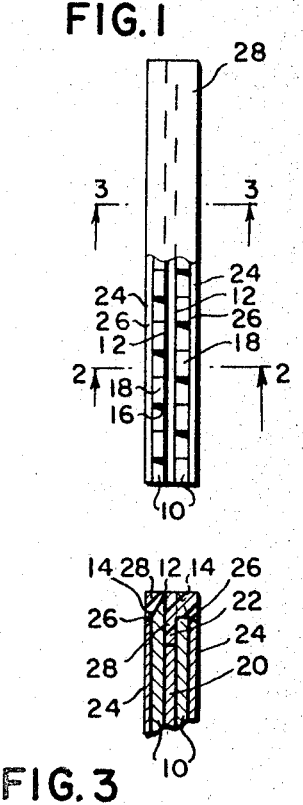
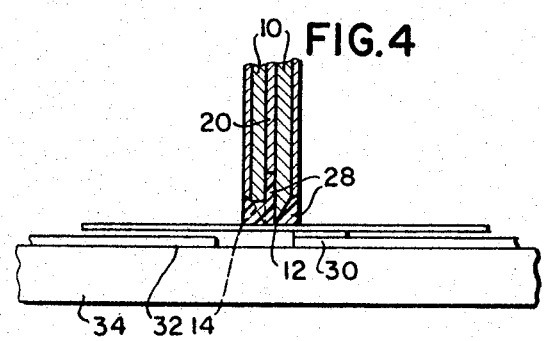
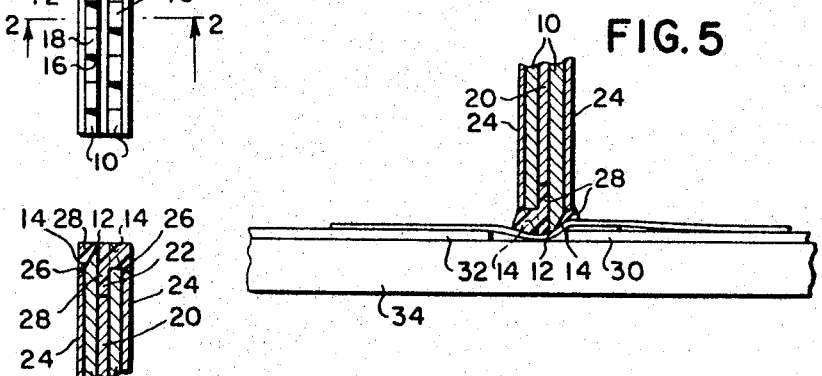
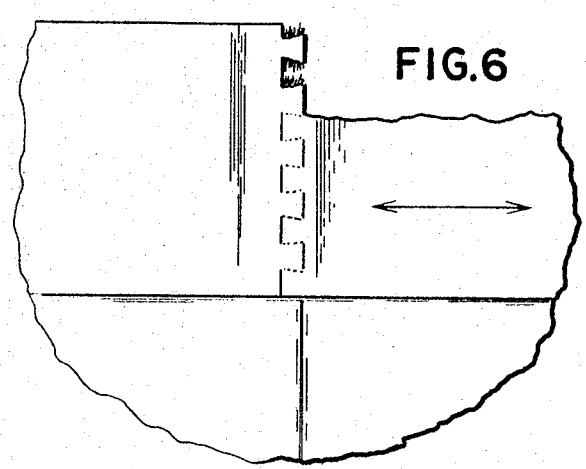
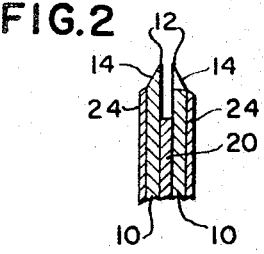
*INVENTOR.*
STANLEY MILTON SILVER

United States Patent Office 3,463,039
Patented Aug. 26, 1969

3,463,039
**KNIFE FOR CUTTING TEAR-LINES IN CARD-
BOARD AND METHOD FOR FORMING THE
SAME**
Stanley Milton Silver, 10 Blenheim St.,
London W. 1, England
Filed Jan. 4, 1967, Ser. No. 607,217
Int. Cl. B26d 1/00; B26f 1/24
U.S. Cl. 83—139                9 Claims

ABSTRACT OF THE DISCLOSURE

Knife section for cardboard cutting die for forming tear-line in cardboard, formed of a pair of cutter blades with cutting edges closely spaced and each formed with intermittent, closely spaced, cutting teeth disposed in staggered relation to teeth of the other; the space between blades and between teeth filled by a continuous mass of resiliently compressible material provided by pouring a viscous liquid material that cures to a solid resilient mass into said spaces.

---

The present invention relates to knives for use in dies for cutting and scoring cardboard, particularly to such knives or knife sections of the die that are intended for forming tear lines in the cardboard; and more specifically, to knives of the type one embodiment of which was described in my companion application No. 611,211, filed Jan. 4, 1967, now U.S. Patent No. 3,394,866, dated Aug. 30, 1968 as adapted for use in forming a multiple-row, intermittent-cut tear line.

Tear lines formed of closely spaced multiple rows of aligned, intermittent, closely spaced cuts, running across the cardboard grain, such as described in my said companion application, have certain advantages. One advange is the ease of tearing. Another advantage is the assurance that the tearing will take place only along the tear lines and thereof, as frequently happens with single-row perforation tear lines that are in common use. However, such multiple-row, intermittent-cut tear lines have heretofore been impossible to attain in a commercially practicable way. In order to form such tear lines, multiple, parallel cutter blades are required, and such blades must be positioned and held in closely spaced parallel relation. To produce multiple, parallel, closely spaced cutter blades in a single piece of die steel is obviously not a commercially practicable procedure, even if conceivably possible. To place multiple blades side by side with rubber spacers between them, as conventionally used for other purposes of parallel scoring, would not produce the closely spaced arrangement of such blades as such rubber spacer would have to be too thin to be effective and, further, would not insure that the blades so spaced would remain in the closely spaced parallel relation.

The present invention, therefore, is directed to methods and means for producing, in a commercially practicable and feasible way, knives formed of cutter blades spaced a minimum distance apart, to thereby be able to produce multiple-row tear lines in cardboard.

It is another object of the present invention to provide knives of the character described, in which the closely spaced, multiple cutter blades are held together at their cutting ends against separation, to be thereby maintained in proper operating position throughout their use.

The present invention also has as its object the provision of multiple cutter-blade knives of the character described which are highly effective for repelling foreign matter from between the blades and thereby require a minimum of maintenance.

It is a further object of the present invention to provide knives of the character described which are strong and durable.

It is also an object of the present invention to provide methods for making such knives that are simple, easy and rapid in use and may be economically produced.

The foregoing and other objects and advantages of the knives of the present invention will become more readily apparent to those skilled in the art from the embodiment thereof shown in the accompanying drawings and in the description following. It is to be understood, however, that such embodiment is shown by way of illustration only, to make the principles and practice of the invention more readily comprehensible, and without any intent of limiting the invention to the specific details therein shown.

In the drawings:

FIG. 1 is a plan view of the cutting end of a tear-line-cutting blade of the present invention, partly broken away to show details;

FIG. 2 is a fragmentary, sectional view taken on line 2—2 of FIG. 1;

FIG. 3 is a fragmentary, sectional view taken on line 3—3 of FIG. 1;

FIG. 4 is an elevational and partly sectional view showing a knife of the present invention in position for forming a tear line and debossing the cardboard along the tear line;

FIG. 5 is a view similar to that of FIG. 4, showing the cardboard cut and debossed; and FIG. 6 is a more or less diagrammatic, fragmentary, plan view, on an enlarged scale, showing the tear line formed in a cardboard; the arrow indicating the direction of the grain of the cardboard.

Referring now in greater detail to the embodiment of the invention illustrated in the drawings, the knife is shown to be formed of two cutter blades, each designated as 10, each having a cutting edge, 12, formed by a ground, sloping face, 14, intersecting one of the sides of the blade. Each of the blades 10 is formed with a plurality of evenly and closely spaced cutter elements, which may be provided by relatively short, inwardly extended, rectangular recesses, 16, formed in the cutting edge 12, defining between them the cutting teeth, 18. The two blades 10 are disposed with their longer sides having the cutting edges 12 in juxaposed relation, and a spacing bar, 20, preferably of metal, is interposed between their stem portions, its edge terminating short of the cutting edge 12, to leave a space 22, between the blades 10. In a preferred embodiment, the spacing bar 20 may be of a thickness of about one thirty-second of an inch (1/32″) and the teeth 18 and the spaces between them of about the same magnitude, and the depth of the recesses 16 may preferably be somewhat greater.

The knife of the present invention is also preferably provided with shoulder bars, 24, one alongside the outer face of each of blades 10. The shoulder bars 24 may preferably blades 10 and terminate short of the tapers forming the cutting edges 12. The blades 10, spacing bar 20 and shoulder blades 24 may be set into a die board in the arrangement described. They may be arranged with their teeth 18 in register with one another or in staggered relation to one another, as illustrated.

In order to provide the knife with a suitable resilient repellant that will extract the cutting teeth from the cardboard being cut and at the same time completely clean the space between the blades from any foreign matter, I utilize a pourable, viscous fluid material that may be poured or troweled over the outer portion of the knives to fill the space above the tapered ends 26 of the shoulder blades 24, the space between the blades 10 and into the recesses 16; such fluid substance being of a type that will, when exposed to air for a limited time, set into a solid, tough and resilient mass, 28, sufficiently compressible to permit cutting of the cardboard, to repel it after cutting and to clean out the spaces between the blades and between the cutting teeth after each cutting to keep the blades free and clear for successive operations. One such fluid material that I have found most useful for the purpose of the present invention is a viscous sealant preparation, in substantially paste form, of the substance known as silicone rubber. Such preparation sets relatively rapidly and forms a solid mass which is tough and of completely suitable resilient characteristics, and, in addition, adherent to the sides of the metal blades so as not to be easily displaced. Furthermore, since the silicone rubber preparation is applied in fluid state, it forms a continuous, unitary mass extending from the exterior sides of the blades 10 above shoulder bars 24, into recesses 16, between the teeth 18 and into the space between blades 10, constituting a cap-like formation that will retain blades 10 in position.

It may here be stated that a mold for the pouring of the fluid material may be readily made by setting up a mold frame around the knife, to knife height, in a manner readily understood and not thought necessary to be described, between which the fluid is poured or troweled, to prevent overflow and to give it the proper shape when set.

I have found that a knife of the present invention forms multiple, parallel rows of cuts or perforations in a cardboard, which provide a greatly improved and highly efficient tear line in the cardboard, along which the cardboard sections to each side may be safely separataed without likelihood of the deviation of the tearing away from the prepared tear line into the body of the cardboard to each side thereof. It will also be clear that, since the multiple lines of intermittent cuts in the cardboard are simultaneously formed, such tear line formation will in no way hinder or retard the die cutting process incorporating the formation of such tear lines.

It may here also be pointed out that the knife of the present invention may be advantageously used to upset the laminated fibrous structure of the cardboard at the tear line, when desired to soften them and to impart to them gasket-like characteristics. As illustrated in FIGS. 4 and 5, this may be done by debossing the cardboard body along the tear line by building up mats, 30 and 32, on the jacket, 34, against which the carboard is rested for cutting and scoring, each mat lying substantially opposite one edge of the knife. Such arrangement of mats results in a debossment of the cardboard by the cap-like mass 28 that tends to delaminate the cardboard between the rows of cuts and to stretch the fibers at that point; thereby making the tearing easier and softening the resulting cardboard teeth, as well as defibrillating their side edges, when tearing.

This completes the description of the multiple-blade tear-line-cutting knife of the invention and the method by which it is produced. While the blades 10 have been described as having a cutting edge that coincides in position with a side face thereof being formed by a single tapered side, it may here be stated that, if desired, its cutting edge may be disposed inwardly of its two sides, being formed by a pair of divergent, ground faces, the angles of such faces being so arranged that the cutting edges of the two blades will be the requisite distance apart, with or without the use of a spacing bar such as 20. It may also here be stated that, if desired, more than two blades may be used in the formation of a knife of the invention.

It is to be understood that whenever the term fluid is used in the specification and claims herein, it is intended to include any composition of a viscosity that it may be either poured or troweled into place, and that the term poured as used in the specification and claims herein is also intended to include troweling and dispensing from a tube.

This completes the description of the tear-line cutting knife of the present invention and the method of forming the same. It will be readily apparent that such knife is highly useful for forming improved tear lines in cardboard and that a practical commercial preparation of such knife is only made possible by the novel method described herein.

It will also be apparent that numerous modifications and variations in the tear-line-forming knife of the present invention and the method by which it is made may be made by anyone skilled in the art, in accordance with the principles of the invention herein set forth and without the exercise of any inventive ingenuity. I desire, therefore, the protection of the patent laws for any and all such modifications and variations that may be made within the spirit of the invention.

What I claim is:

1. A knife for forming a tear line in a cardboard, or the like, comprising a plurality of cutter blades, each having a cutting edge, arranged in substantially parallel, closely and evenly spaced relation and having a plurality of relatively short, longitudinally spaced cutting elements provided in their cutting edges, and a solid, non-porous resilient mass held on and encompassing said cutting edges of said knife, said mass extending between said cutting elements and over the sides thereof.

2. The knife of claim 1, wherein a spacing bar is disposed between said blades, said spacing bar having its adjacent edge terminate short of said cutting elements, said mass substantially filling the space above said spacing bar.

3. The knife of claim 1, wherein shoulder bars are disposed against the outer faces of said knife, said shoulder bars having their adjacent edges terminating short of said cutting elements, said mass filling the space above said shoulder bars.

4. The knife of claim 1, wherein said cutting elements in said cutter blades are evenly and regularly spaced from one another.

5. The knife of claim 4, wherein said cutting elements in each of said cutter blades are arranged in staggered relation relative to the cutting elements of the others.

6. The knife of claim 1, wherein said blades are each formed with a tapered cutting edge and said cutting elements comprise cutting teeth defined by recesses cut into said cutting edges.

7. The knife of claim 6, wherein the cutting edges of said teeth are spaced apart about one thirty-second of an inch ($\frac{1}{32}''$) and the teeth and the spaces defining them from one another are each about one thirty-second of an inch long.

8. The knife of claim 7, wherein said cutting teeth and each of said cutter blades are arranged in staggered relation to the teeth of the other.

9. The knife of claim 8, wherein said cutting edge in each said cutter blade is formed by a tapered end face intersecting a side face of the blade and said blades are disposed with their said side faces in juxtaposed relation.

References Cited

UNITED STATES PATENTS

| 508,953 | 11/1893 | Lavigne | 30—304 |
| 1,082,985 | 12/1913 | Wilder | 83—124 |
| 2,850,096 | 9/1958 | Berlin et al. | 76—107 |

ANDREW R. JUHASZ, Primary Examiner

JAMES F. COAN, Assistant Examiner

U.S. Cl. X.R.

76—107; 83—168, 660, 695, 698; 93—58.3; 156—584